US012242501B2

(12) United States Patent
Stein et al.

(10) Patent No.: US 12,242,501 B2
(45) Date of Patent: Mar. 4, 2025

(54) APPARATUS, METHOD, AND COMPUTER PROGRAM PRODUCT FOR TELEMETRY FORMAT CONVERSION

(71) Applicant: Honeywell International Inc., Charlotte, NC (US)

(72) Inventors: Rodney Stein, Edmonton (CA); Ambika Khatri, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 70 days.

(21) Appl. No.: 18/338,504

(22) Filed: Jun. 21, 2023

(65) Prior Publication Data

US 2024/0427793 A1    Dec. 26, 2024

(51) Int. Cl.
*G06F 16/25* (2019.01)
(52) U.S. Cl.
CPC .................... *G06F 16/258* (2019.01)
(58) Field of Classification Search
CPC ....................................................... G06F 16/258
See application file for complete search history.

(56) References Cited

U.S. PATENT DOCUMENTS

2022/0237061 A1\* 7/2022 Sethi ................... G06F 11/3065

\* cited by examiner

Primary Examiner — Truong V Vo
(74) Attorney, Agent, or Firm — ALSTON & BIRD LLP

(57) ABSTRACT

A format conversion system provides an extendable library of data format conversion functions configured to convert raw data (e.g., telemetry data) from any number of original formats to at least one normalized format. Received raw data is routed to the appropriate format conversion function in the library based on format conversion routing metadata generated with respect to raw data from a particular source and/or a mapping of data sources to corresponding original data formats and/or to corresponding format conversion functions. A selected format conversion function from the library is executed with respect to raw data from particular data sources, and normalized data corresponding to the raw data is output. A format conversion function definition interface enables user configuration of the various format conversion functions, and a configuration interface enables user configuration of the mapping used to route the raw data to the various format conversion functions.

20 Claims, 5 Drawing Sheets

APPARATUS, METHOD, AND COMPUTER PROGRAM PRODUCT FOR TELEMETRY FORMAT CONVERSION

TECHNICAL FIELD

Embodiments of the present disclosure generally relate to raw data normalization, and specifically, in some examples, to converting raw telemetry data from operational systems into a normalized data format.

BACKGROUND

Applicant has identified example technical challenges and difficulties associated with current solutions for converting raw telemetry data from operational systems into a normalized data format. Through applied effort, ingenuity, and innovation, Applicant has solved problems relating to converting raw telemetry data from operational systems into a normalized data format.

BRIEF SUMMARY

According to one aspect, example embodiments of the present disclosure include an apparatus comprising at least one processor and at least one non-transitory memory comprising program code stored thereon. The at least one non-transitory memory and the program code are configured to, with the at least one processor, cause the apparatus to at least: receive raw data units and format conversion routing metadata associated with the raw data units, wherein raw data comprised by each raw data unit is formatted according to a particular original data format corresponding to a source of the raw data; for each particular raw data unit of the received raw data units, select a format conversion function for the particular raw data unit from a plurality of format conversion functions based at least in part on the format conversion routing metadata associated with the particular raw data unit, wherein each format conversion function of the plurality of format conversion functions is configured to convert the raw data comprised by a given raw data unit from the particular original data format associated with the format conversion function into a particular normalized data format associated with the format conversion function; and cause execution of the selected format conversion function with respect to the particular raw data unit, wherein execution of the selected format conversion function with respect to the particular raw data unit outputs normalized data that is a normalized instance of the raw data comprised by the particular raw data unit, which normalized data is formatted according to the normalized data format associated with the selected format conversion function.

In some embodiments, the at least one non-transitory memory and the program code are configured to, with the at least one processor, further cause the apparatus to at least generate the format conversion routing metadata for each raw data unit based at least in part on the source of the raw data comprised by the raw data unit.

In some embodiments, the at least one non-transitory memory and the program code are configured to, with the at least one processor, further cause the apparatus to at least insert the normalized data output for each corresponding raw data unit into a data stream associated with the raw data unit.

In some embodiments, at least a subset of the plurality of format conversion functions are each associated with a different original data format from a plurality of different original data formats.

In some embodiments, selecting the format conversion function for each particular raw data unit comprises selecting the format conversion function that is associated with the original data format according to which the raw data of the particular raw data unit is formatted.

In some embodiments, selecting the format conversion function for each particular raw data unit is based at least in part on a mapping of sources of the raw data of the raw data units each to an associated format conversion function of the plurality of format conversion functions. In one example, the format conversion routing metadata associated with each particular raw data unit may identify the source of the raw data comprised by the particular raw data unit.

In some embodiments, selecting the format conversion function for the particular raw data unit and causing execution of the selected format conversion function with respect to the particular raw data unit is performed only in response to determining that the format conversion routing metadata associated with the particular raw data unit indicates that the raw data of the raw data unit requires conversion to a normalized data format.

In some embodiments, selecting the format conversion function for the particular raw data unit and causing execution of the selected format conversion function with respect to the particular raw data unit is performed only in response to determining, based at least in part on the format conversion routing metadata, that a format conversion function has been defined with respect to the source of the raw data comprised by the particular raw data unit.

In some embodiments, the raw data comprised by the raw data unit and the normalized data comprise telemetry data associated with at least one operational system, and the at least one non-transitory memory and the program code are configured to, with the at least one processor, further cause the apparatus to at least cause performance of at least one enterprise management operation with respect to the at least one operational system based at least in part on normalized telemetry data of the normalized data.

According to another aspect, embodiments of the present invention feature a method comprising: receiving raw data units and format conversion routing metadata associated with the raw data units, wherein raw data comprised by each raw data unit is formatted according to a particular original data format corresponding to a source of the raw data; for each particular raw data unit of the received raw data units, selecting a format conversion function for the particular raw data unit from a plurality of format conversion functions based at least in part on the format conversion routing metadata associated with the particular raw data unit, wherein each format conversion function of the plurality of format conversion functions is configured to convert the raw data comprised by a given raw data unit from the particular original data format associated with the format conversion function into a particular normalized data format associated with the format conversion function; and causing execution of the selected format conversion function with respect to the particular raw data unit, wherein execution of the selected format conversion function with respect to the particular raw data unit outputs normalized data that is a normalized instance of the raw data comprised by the particular raw data unit, which normalized data is formatted according to the normalized data format associated with the selected format conversion function.

According to another aspect, embodiments of the present invention feature a computer program product comprising at least one non-transitory computer-readable storage medium having computer-readable program code portions stored therein. The computer-readable program code portions comprise an executable portion configured to: receive raw data units and format conversion routing metadata associated with the raw data units, wherein raw data comprised by each raw data unit is formatted according to a particular original data format corresponding to a source of the raw data; for each particular raw data unit of the received raw data units, select a format conversion function for the particular raw data unit from a plurality of format conversion functions based at least in part on the format conversion routing metadata associated with the particular raw data unit, wherein each format conversion function of the plurality of format conversion functions is configured to convert the raw data comprised by a given raw data unit from the particular original data format associated with the format conversion function into a particular normalized data format associated with the format conversion function; and cause execution of the selected format conversion function with respect to the particular raw data unit, wherein execution of the selected format conversion function with respect to the particular raw data unit outputs normalized data that is a normalized instance of the raw data comprised by the particular raw data unit, which normalized data is formatted according to the normalized data format associated with the selected format conversion function.

According to one aspect, example embodiments of the present disclosure include an apparatus comprising at least one processor and at least one non-transitory memory comprising program code stored thereon. The at least one non-transitory memory and the program code are configured to, with the at least one processor, cause the apparatus to at least: receive format conversion function definition input defining a plurality of format conversion functions each associated with a corresponding original data format of a plurality of original data formats and a corresponding normalized data format; present a format conversion interface configured to receive format conversion requests with respect to the plurality of format conversion functions defined via the format conversion function definition input; receive the format conversion requests via the format conversion interface, each format conversion request comprising raw data formatted according to an original data format, of the plurality of original data formats, that corresponds to a source of the raw data; in response to receiving each particular format conversion request, execute a selected format conversion function, of the plurality of format conversion functions defined via the format conversion function definition input, that is associated with the original data format of the raw data comprised by the particular format conversion request, wherein execution of the selected format conversion function outputs normalized data corresponding to the raw data of the particular format conversion request, the normalized data being a normalized instance of the corresponding raw data and being formatted according to the normalized data format associated with the selected format conversion function; and cause performance of at least one enterprise management operation based at least in part on the normalized data.

In some embodiments, the at least one non-transitory memory and the program code are configured to, with the at least one processor, further cause the apparatus to at least: present a format conversion function definition interface configured to receive the format conversion function definition input; and receive the format conversion function definition input via the presented format conversion function definition interface.

In some embodiments, the at least one non-transitory memory and the program code are configured to, with the at least one processor, further cause the apparatus to at least: perform at least one validation operation with respect to the plurality of format conversion functions defined via the format conversion function definition input; and present the format conversion interface only with respect to a subset of the plurality of format conversion functions that were successfully validated via the at least one validation operation. The at least one validation operation may include validating that a given format conversion function correctly converts raw data from a particular original data format associated with the given format conversion function into a particular normalized data format associated with the given format conversion function, validating that a given format conversion function does not attempt to cause performance of an operation that is unauthorized in a present context, and/or validating that a given format conversion function does not cause certain harmful and/or malicious operations to be performed as a result of subsequent processing of normalized data output by the given format conversion function.

In some embodiments, each format conversion function, of the plurality of format conversion functions defined via the format conversion function definition input, is configured to convert given raw data from a particular original data format associated with the format conversion function into a particular normalized data format associated with the format conversion function. At least a subset of the plurality of format conversion functions defined via the format conversion function definition input may be each associated with a different original data format from a plurality of different original data formats.

In some embodiments, the at least one enterprise management operation includes storing the normalized data in at least one data repository.

In some embodiments, the raw data comprised by the format conversion requests comprises telemetry data associated with at least one operational system, and the at least one enterprise management operation is caused to be performed with respect to the at least one operational system based at least in part on normalized telemetry data output via execution of the format conversion functions.

According to another aspect, embodiments of the present invention feature a method comprising: receiving format conversion function definition input defining a plurality of format conversion functions each associated with a corresponding original data format of a plurality of original data formats and a corresponding normalized data format; presenting a format conversion interface configured to receive format conversion requests with respect to the plurality of format conversion functions defined via the format conversion function definition input; receiving the format conversion requests via the format conversion interface, each format conversion request comprising raw data formatted according to an original data format, of the plurality of original data formats, that corresponds to a source of the raw data; in response to receiving each particular format conversion request, executing a selected format conversion function, of the plurality of format conversion functions defined via the format conversion function definition input, that is associated with the original data format of the raw data comprised by the particular format conversion request, wherein execution of the selected format conversion function outputs normalized data corresponding to the raw data of the particular format conversion request, the normalized data being a normalized instance of the corresponding raw data and being formatted according to the normalized data format associated with the selected format conversion function; and causing performance of at least one enterprise management operation based at least in part on the normalized data.

According to another aspect, embodiments of the present invention feature a computer program product comprising at least one non-transitory computer-readable storage medium having computer-readable program code portions stored therein. The computer-readable program code portions comprise an executable portion configured to: receive format conversion function definition input defining a plurality of format conversion functions each associated with a corresponding original data format of a plurality of original data formats and a corresponding normalized data format; present a format conversion interface configured to receive format conversion requests with respect to the plurality of format conversion functions defined via the format conversion function definition input; receive the format conversion requests via the format conversion interface, each format conversion request comprising raw data formatted according to an original data format, of the plurality of original data formats, that corresponds to a source of the raw data; in response to receiving each particular format conversion request, execute a selected format conversion function, of the plurality of format conversion functions defined via the format conversion function definition input, that is associated with the original data format of the raw data comprised by the particular format conversion request, wherein execution of the selected format conversion function outputs normalized data corresponding to the raw data of the particular format conversion request, the normalized data being a normalized instance of the corresponding raw data and being formatted according to the normalized data format associated with the selected format conversion function; and cause performance of at least one enterprise management operation based at least in part on the normalized data.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

Figure 1:
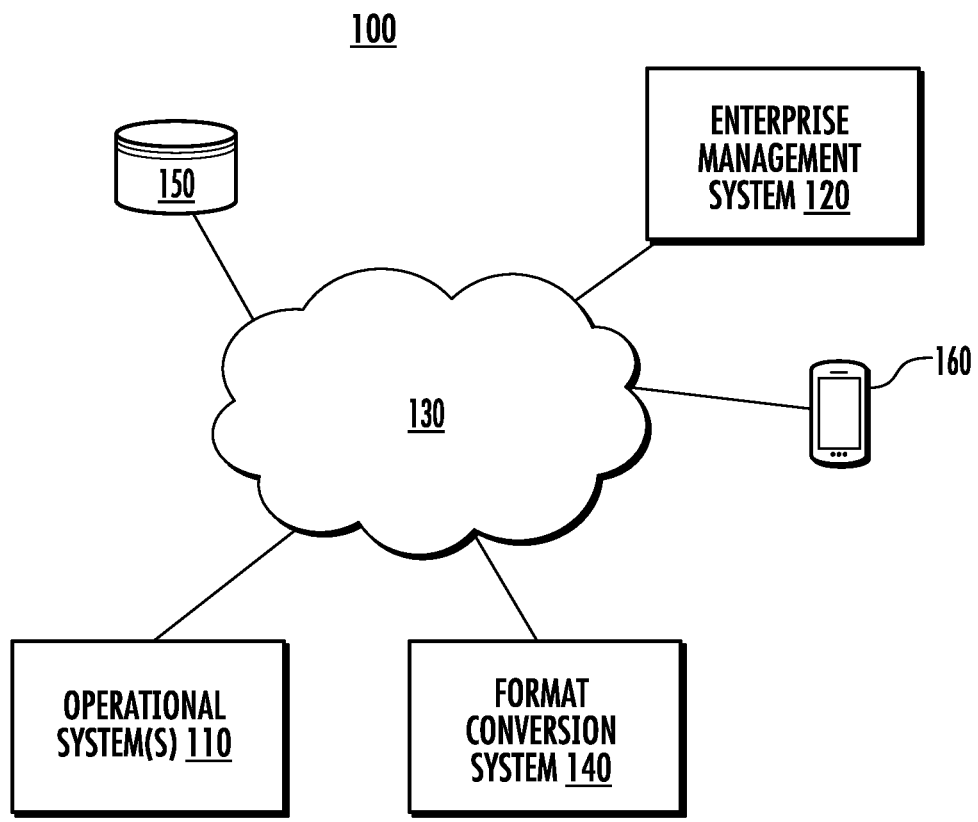
Figure 2:
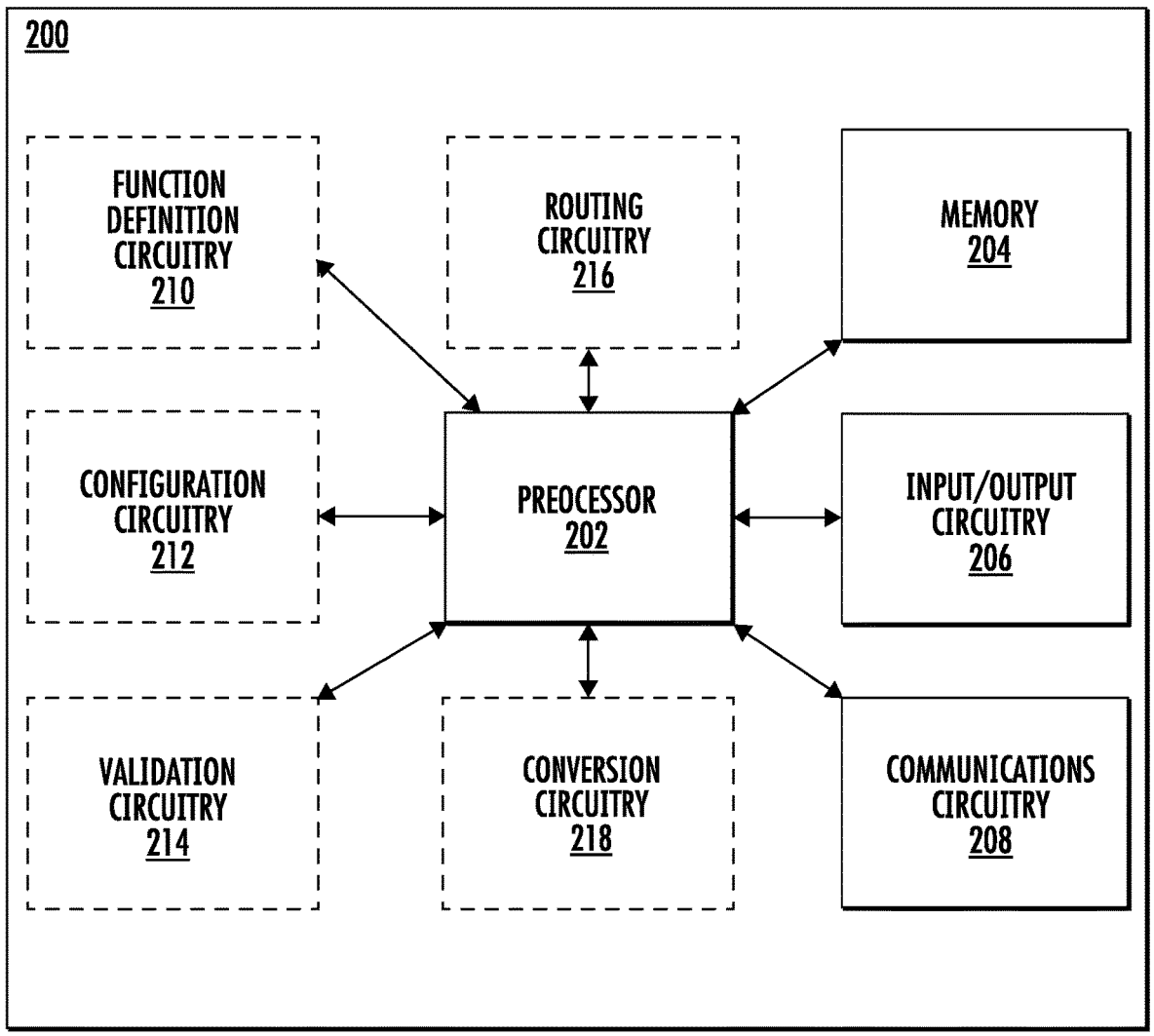
Figure 3:
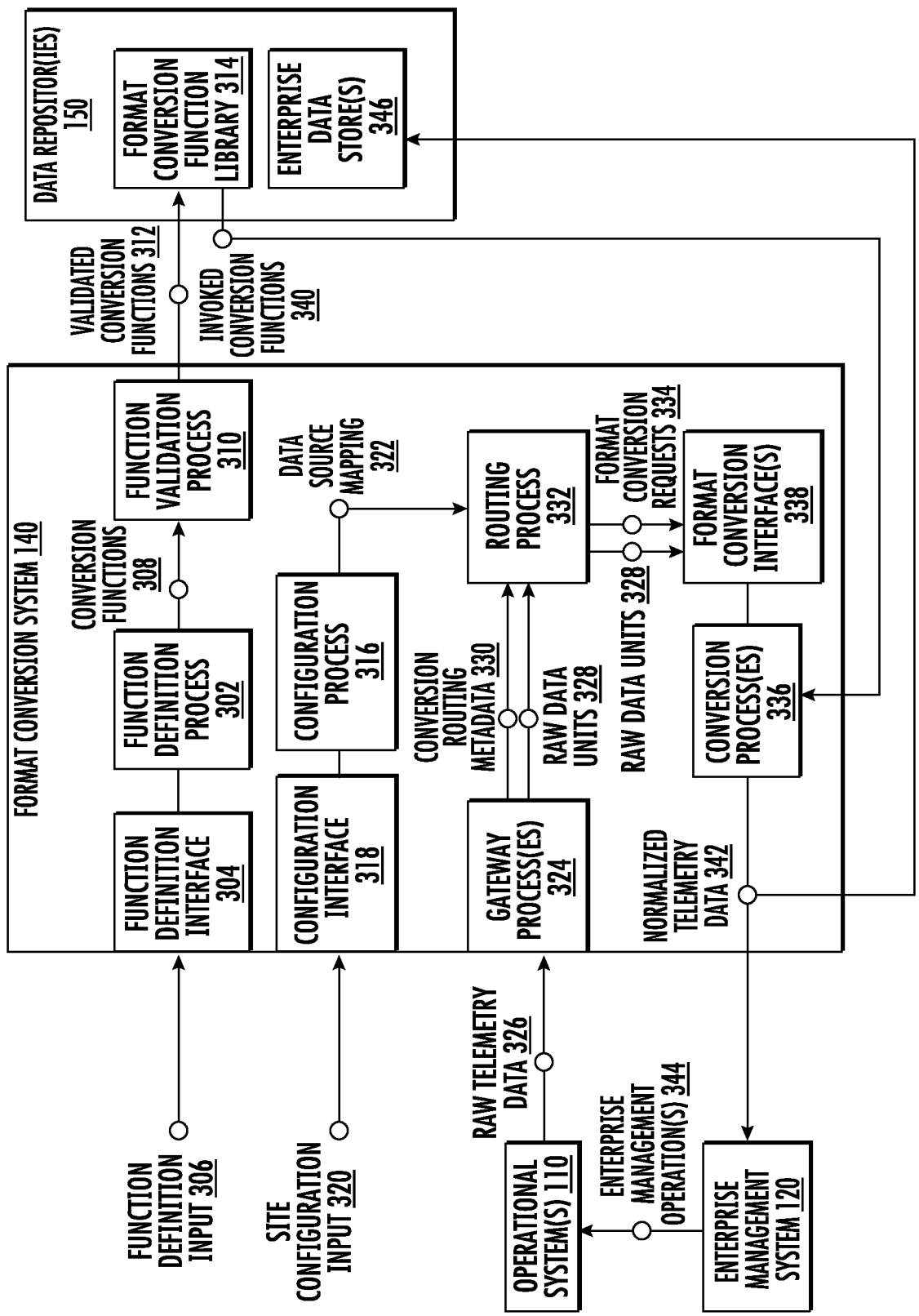
Figure 4:
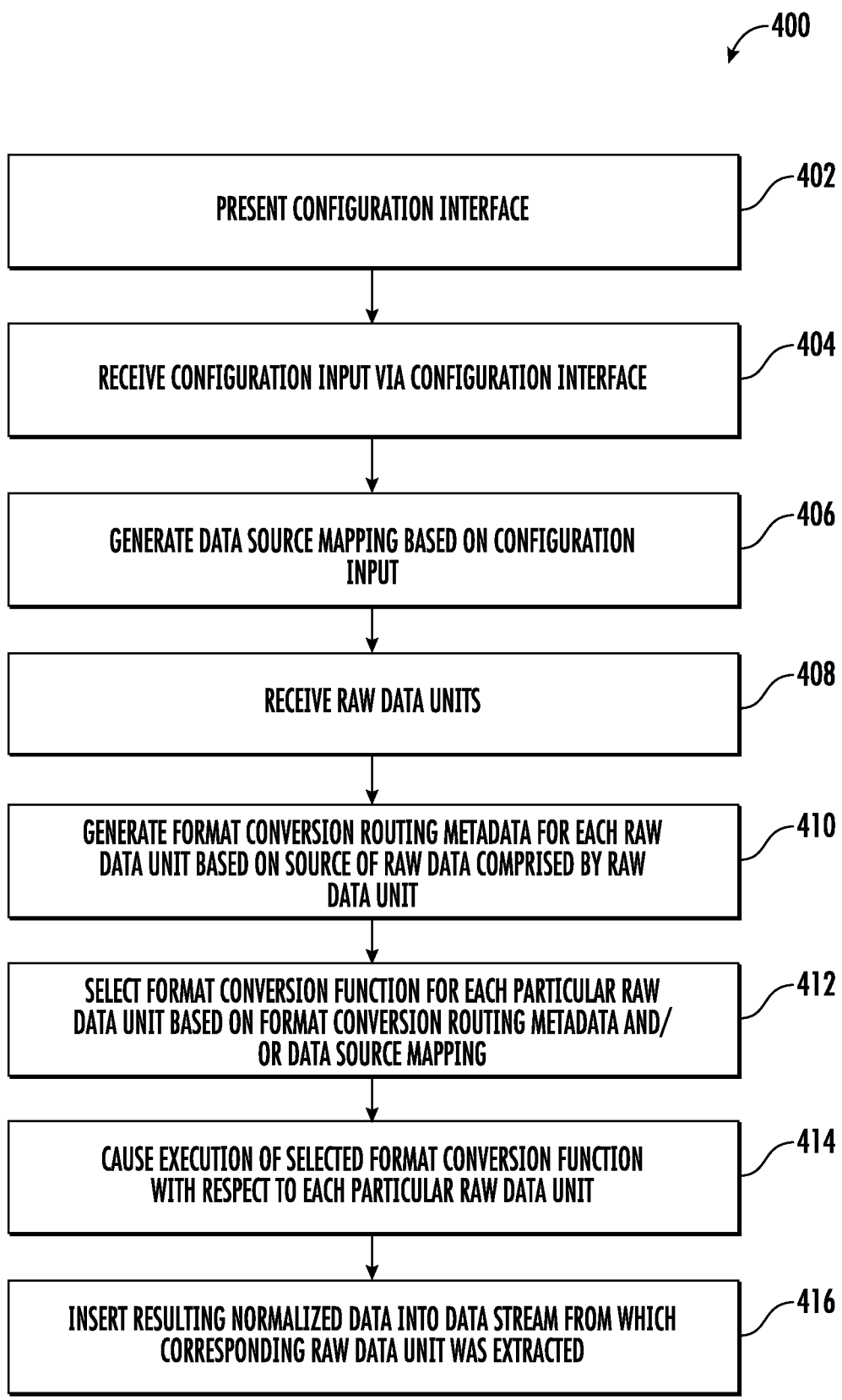
Figure 5:
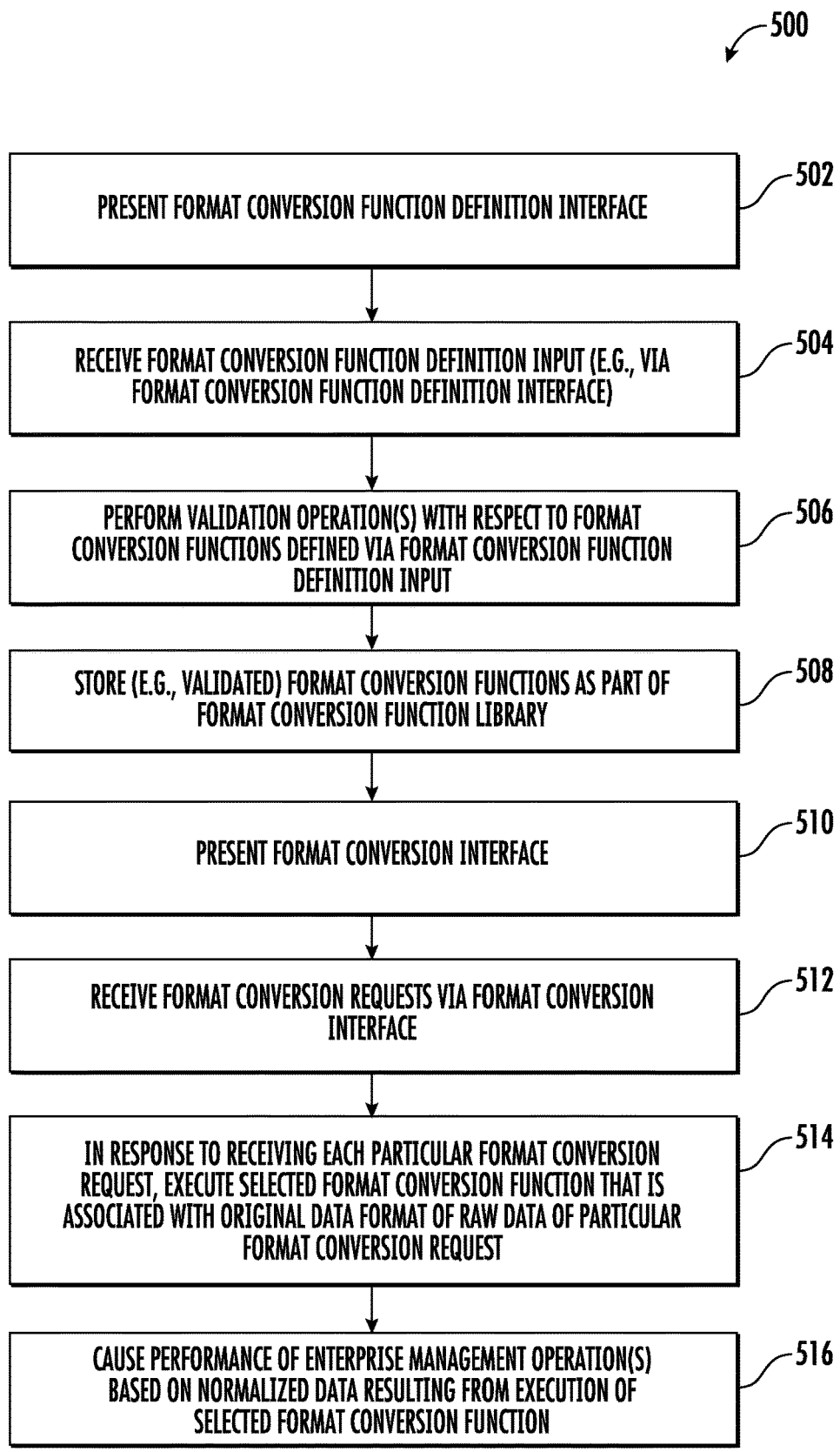

Having thus described the embodiments of the disclosure in general terms, reference now will be made to the accompanying drawings, which are not necessarily drawn to scale, and wherein:

FIG. 1 illustrates an exemplary block diagram of an environment in which embodiments of the present disclosure may operate;

FIG. 2 illustrates an exemplary block diagram of an example apparatus that may be specially configured in accordance with an example embodiment of the present disclosure;

FIG. 3 illustrates an exemplary format conversion system, in accordance with at least some example embodiments of the present disclosure;

FIG. 4 is a flowchart depicting an example process for routing format conversion requests and/or raw data to a selected format conversion function from a plurality of format conversion functions, in accordance with at least some example embodiments of the present disclosure; and FIG. 5 is a flowchart depicting an example process for using functions from a format conversion function library to convert raw data from an original format to a normalized format, in accordance with at least some example embodiments of the present disclosure.

DETAILED DESCRIPTION

Some embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The use of the term "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communication circuitry, input/output circuitry, and the like. In some embodiments, other elements may provide or supplement the functionality of particular circuitry. Alternatively or additionally, in some embodiments, other elements of a system and/or apparatus described herein may provide or supplement the functionality of another particular set of circuitry. For example, a processor may provide processing functionality to any of the sets of circuitry, a memory may provide storage functionality to any of the sets of circuitry, communications circuitry may provide network interface functionality to any of the sets of circuitry, and/or the like.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

In some exemplary scenarios, entities such as businesses or other organizations may have and/or may be responsible for maintaining enterprise systems of various types, including operational systems and/or computer, software, and/or network systems, to list a few examples.

Operational systems of and/or maintained by an enterprise may include building systems (e.g., heating, ventilation, and air conditioning (HVAC) systems, building automation systems, security systems) and/or industrial systems (e.g., manufacturing systems, sorting and distribution systems, discrete and process based manufacturing systems). These operational systems are configured, in some examples, to monitor and/or control various physical aspects of a premises, building, site, location, environment, mechanical system, industrial plant or process, laboratory, manufacturing plant or process, vehicle, utility plant or process, and/or the like. An operational system comprises various assets, including, in some examples, equipment (e.g., controllers, sensors, actuators) configured to perform the functionality attributed to the operational system and/or components, devices, and/or subsystems of the operational system. In some examples, the operational system, via its various assets, may monitor and/or control operation of a residential or commercial building or premises (e.g., HVAC systems, security systems, building automation systems, and/or the like). In other examples, the operational system may monitor and/or control operation of a manufacturing plant (e.g., manufacturing machinery, conveyor belts, and/or the like). In yet other examples, the operational system may monitor and/or control operation of a vehicle.

In another example, computer, software, and/or network systems of and/or managed by an enterprise may include one or more enterprise networks (e.g., comprising user devices, server devices, and/or networking devices connected to each other via one or more networks), one or more cloud-based or on-site, centralized and/or distributed software systems, content management systems, knowledge management systems, project management systems, customer relationship management systems, human resources management systems, and/or any systems associated with internal and/or external processes and/or operations of an enterprise.

These various enterprise systems of and/or managed by enterprises may generate data of various types, and an enterprise that has and/or is responsible for managing such enterprise systems often generates, collects, and/or accumulates a body of enterprise data that may contain data from and/or associated with any or all of the enterprise systems associated with the enterprise systems and/or any processes and/or operations of the enterprise. For example, telemetry data generated by, within, and/or with respect to operational systems maintained by an enterprise may be collected and/or aggregated by the enterprise. Telemetry data may comprise sensor data, including digital and/or analog sensed values, states, and/or measurements generated via sensing elements of sensors, operational data, including sensed, calculated, user-configured, and/or automatically set operating parameters (e.g., rotations per minute (RPM), power usage, temperature) of various types of equipment such as motors, vibration data indicative of sensed or determined vibrations of equipment or components such as bearings, and/or surge power startup data, to list a few examples.

In one example scenario, a given enterprise may be responsible for the management of several operational systems, across several sites and locations, each comprising several (e.g., possibly thousands) of assets. Management of such systems often includes monitoring conditions and/or performance of the systems' assets, facilitating and/or performing service on or physical maintenance of the assets, and/or controlling the assets in order to optimize the assets' and systems' performance and/or fulfill other objectives of the enterprise.

Enterprise management systems, such as enterprise performance management (EPM) systems, have been proposed to monitor and maintain enterprise systems, including, in one example, operational systems. For example, in some operational systems, it has been proposed to communicatively connect the operational system(s), including assets of the operational system(s), to a remote monitoring system (e.g., a cloud platform) configured to aggregate enterprise data (e.g., telemetry data) with respect to some or all of the assets of one or more operational systems (e.g., deployed at one or more sites or locations). This operational data may comprise sensor data (e.g., generated via assets such as sensors of the operational system) or any other data generated with respect to and/or describing operation of the operational systems and/or assets thereof. This aggregated enterprise data, including telemetry data, may be collected, archived, and consulted in order to provide visibility into and perform various enterprise management operations, including control operations with respect to the operational system(s), for example. These monitoring systems may be configured to provide, for each enterprise, an enterprise-wide, top-to-bottom, historical and/or real-time, view of the status of various processes, assets, people, and/or other objects associated with all of the operational system(s) managed by the enterprise. The monitoring systems may be configured to generate and present insights (e.g., predictions and/or recommendations) for optimizing performance of the operational system(s) and assets thereof. These insights are often generated using machine learning models, which may be developed, configured, and/or trained using one or more machine learning algorithms based on the aggregated data.

In another example, it may be possible to communicatively connect other types of enterprise systems, including any computer, software, and/or network systems of or managed by an enterprise, to an enterprise management system configured to receive, collect, generate, and/or access enterprise data associated with the computer, software, and/or network systems with respect to some or all of the equipment, devices, processes, operations, knowledge, products, services, users, employees, customers, markets, campaigns, and/or performance associated with any or all of the various systems and internal or external processes and/or operations implemented, managed, and/or facilitated by said systems.

Data (e.g., telemetry data) collected by enterprises may be generated by various data sources, which may be, in some examples, devices, sensors, and/or components of, within, connected to, and/or associated with the operational systems. A data source may generate its data such that the data is formatted according to a particular original data format associated with the data source. For example, certain types of data sources having certain common shared characteristics (e.g., being produced by a particular manufacturing entity, being of a certain device or sensor type, having a date of manufacture within a certain date range) may be configured to generate data that is formatted according to a particular original data format, which may be a proprietary data format established by a manufacturing or system installation entity associated with the data sources.

Many enterprise systems, including operational systems, may be heterogenous with respect to their various components that are data sources, having data sources that generate data according to a plurality of different original data formats by virtue of having components (e.g., the data sources) produced by a plurality of different manufacturers and/or having been manufactured across a wide range of dates.

At the same time, enterprise management systems and/or any processes that would consume the data collected by an enterprise may need any collected data (e.g., telemetry data) to be formatted according to a particular normalized or standardized data format in order to be able to consume, interpret, analyze, and/or utilize the collected data in a manner sufficient for performing various enterprise management operations.

Collecting data from data sources that use different original data formats and converting the collected data into a normalized format presents a number of challenges. Currently, data sources (e.g., devices or components) need to be configured to generate data in the desired format or otherwise to convert the data internally (or via other on-site/edge components or devices) before transmitting it on to the enterprise management system. However, in many cases, it may not be possible to configure the original data format used by various data sources, and even additional on-site components specifically configured to convert data to the normalized format may be difficult to secure, update, and ensure sufficient processing power to handle the workload of converting the data. Moreover, configuring these additional components or even end processes that consume the collected data to convert data to the normalized format requires keeping track of all possible formats of incoming data, including updating these components and processes to accommodate new and/or updated formats, and using often-limited processing and memory resources available to the processes to perform conversion operations on incoming data. As a result, collecting data from certain types of data sources may be impractical if not impossible.

Examples of the present disclosure concern a format conversion system that provides an extendable library of conversion functions configured to convert raw data from any number of original formats to at least one normalized or standardized format. In various embodiments, the presently disclosed format conversion system may be interposed between operational systems (e.g., installed at a site) and a (e.g., cloud-based) enterprise management system, removing the complexity of converting the raw data from the end (e.g., on-site, local, embedded within the operational systems) processes and allowing data sources and/or operational systems to generate the raw data (e.g., telemetry data) in any original format and to transmit the raw data in its original format to the cloud for further processing and/or storage. The format conversion system may be configured to maintain a user-configurable, expandable library of format conversion functions, each of which may be validated to ensure that the functions are correctly formulated, do not perform any unauthorized operations, and do not output data that can cause harm to other processes, sub-systems, and/or components that subsequently process the output data. In various embodiments, the format conversion system may comprise routing functionality that reads format conversion routing metadata associated with the collected raw data in order to detect that the raw data requires normalization, select the appropriate format conversion function to use to convert the raw data, determine if no format conversion function is available for the raw data, and/or to re-route normalized data back into a data stream (e.g., telemetry stream) associated with the raw data, including, for example a data stream from which the raw data was extracted and/or an alternate data stream, among other examples.

FIG. 1 illustrates an exemplary block diagram of an environment 100 in which embodiments of the present disclosure may operate. Specifically, FIG. 1 illustrates one or more operational systems 110, a format conversion system 140, an enterprise management system 120, one or more data repositories 150, and one or more user devices 160, all connected to a network 130.

The network 130 may be embodied in any of a myriad of network configurations. In some embodiments, the network 130 may be a public network (e.g., the Internet). In some embodiments, the network 130 may be a private network (e.g., an internal localized, or closed-off network between particular devices). In some other embodiments, the network 130 may be a hybrid network (e.g., a network enabling internal communications between particular connected devices and external communications with other devices). In various embodiments, the network 130 may include one or more base station(s), relay(s), router(s), switch(es), cell tower(s), communications cable(s), routing station(s), and/or the like. In various embodiments, components of the environment 100 may be communicatively coupled to transmit data to and/or receive data from one another over the network 130. Such configuration(s) include, without limitation, a wired or wireless Personal Area Network (PAN), Local Area Network (LAN), Metropolitan Area Network (MAN), Wide Area Network (WAN), and/or the like.

The one or more data repositories 150 may be configured to receive, store, and/or transmit data. In some embodiments, the one or more data repositories 150 may store a format conversion function library of user-configurable and individually invokable format conversion functions for converting data (e.g., raw data) from a first format (e.g., original format) to a second format (e.g., normalized format). Moreover, in some embodiments, the one or more data repositories 150 may store a data source mapping used to select from among the format conversion functions in connection with raw data from a particular data source. Additionally, in some embodiments, the one or more data repositories may store (e.g., in one or more enterprise data stores associated with an enterprise and/or the enterprise management system 120) normalized data output by the format conversion functions and/or any data derived therefrom, for example, as a result of performing various calculations, transformations, analyses, combinations, and/or selections with respect to the normalized data.

The one or more user devices 160 may be associated with and/or operated by users of the enterprise management system 120, the format conversion system 140, and/or any of the operational system(s) 110. In various embodiments, the enterprise management system 120 may cause data associated with the operational systems 110 (e.g., normalized data, any data derived from the normalized data) to be transmitted to and/or displayed on the user device(s) 160.

The one or more operational systems 110 may refer to operational systems and/or enterprise systems of any type as defined and described above, such as building systems, industrial systems, and/or computer, software, and/or network systems, among other examples.

The format conversion system 140 may be a computing system or device (e.g., server system) configured via hardware, software, firmware, and/or a combination thereof, to perform data format conversion functionality comprising, for example, receiving function definition input, generating and validating format conversion functions, receiving site configuration input, generating a data source mapping, generating format conversion routing metadata associated with raw data received from the operational system(s) 110, routing the raw data from various data sources to various format conversion functions, and invoking the various format conversion functions, to list a few examples. In some embodiments, the format conversion system 140 may be a subsystem of and/or otherwise integrated with the enterprise management system 120.

The enterprise management system 120 may be or comprise an enterprise management system or EPM system as previously defined and described and/or may be or comprise a computing system or device (e.g., server system) configured via hardware, software, firmware, and/or a combination thereof, to perform various operations with respect to the operational system(s) 110, (e.g., normalized) telemetry data generated thereby, and/or any calculations, transformations, analyses, combinations, and/or selections with respect to the telemetry data. For example, the enterprise management system 120 may be configured to (e.g., in conjunction with the user device(s) 160) present telemetry data and/or any data derived therefrom via any calculations, transformations, analyses, combinations, and/or selections performed with respect to the telemetry data. In another example, the enterprise management system 120 may be configured to perform one or more enterprise management operations (e.g., monitoring and control operations, insight generation and presentation operations) with respect to the operational system(s) 110 based at least in part on the telemetry data and/or any data derived therefrom via any calculations, transformations, analyses, combinations, and/or selections performed with respect to the ingested instance(s) of the data set(s).

In some embodiments, the enterprise management system 120 may be configured to present and/or process any output data resulting from operations performed by the format conversion system 140 and/or the operational system(s) 110, including, for example, presenting one or more monitoring, control, and/or insight interfaces within a graphical user interface (GUI) rendered on one or more displays of one or more of the user devices 160. The one or more interfaces may comprise one or more graphical elements for displaying the output data (e.g., including data resulting from processing the output data) and/or one or more interactable elements for receiving presentation and/or analysis input, for example, as user input. The presentation and/or analysis input may represent one or more selections of presentation parameters for determining how the output data is displayed and/or one or more selections of analysis parameters for determining how the output data is processed, to name a few examples. The output data presented and/or processed by the enterprise management system 120 may include the normalized data output by the format conversion system 140 and/or any data derived therefrom via any calculations, transformations, analyses, combinations, and/or selections performed with respect to the normalized data, for example.

While FIG. 1 illustrates certain components as separate, standalone entities communicating over the network 130, various embodiments are not limited to this configuration. In other embodiments, one or more components may be directly connected and/or share hardware or the like.

FIG. 2 illustrates an exemplary block diagram of an example apparatus that may be specially configured in accordance with an example embodiment of the present disclosure. Specifically, FIG. 2 depicts an example computing apparatus 200 ("apparatus 200") specially configured in accordance with at least some example embodiments of the present disclosure. Examples of an apparatus 200 may include, but is not limited to, one or more components of one or more operational systems 110, a format conversion system 140, an enterprise management system 120, data repositories 150, and/or user devices 160. The apparatus 200 includes processor 202, memory 204, input/output circuitry 206, communications circuitry 208, and/or function definition circuitry 210, configuration circuitry 212, validation circuitry 214, routing circuitry 216, and/or conversion circuitry 218. In some embodiments, the apparatus 200 is configured to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), memory(ies), circuitry(ies), and/or the like to perform their associated functions such that duplicate hardware is not required for each set of circuitry.

In various embodiments, a device, system, or apparatus, such as apparatus 200 of one or more components of one or more operational systems 110, a format conversion system 140, an enterprise management system 120, data repositories 150, and/or user devices 160, may refer to, for example, one or more computers, computing entities, desktop computers, mobile phones, tablets, phablets, notebooks, laptops, distributed systems, servers, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein. In this regard, the apparatus 200 embodies a particular, specially configured computing entity transformed to enable the specific operations described herein and provide the specific advantages associated therewith, as described herein.

Processor 202 or processor circuitry 202 may be embodied in a number of different ways. In various embodiments, the use of the terms "processor" should be understood to include a single core processor, a multi-core processor, multiple processors internal to the apparatus 200, and/or one or more remote or "cloud" processor(s) external to the apparatus 200. In some example embodiments, processor 202 may include one or more processing devices configured to perform independently. Alternatively, or additionally, processor 202 may include one or more processor(s) configured in tandem via a bus to enable independent execution of operations, instructions, pipelining, and/or multithreading.

In an example embodiment, the processor 202 may be configured to execute instructions stored in the memory 204 or otherwise accessible to the processor. Alternatively, or additionally, the processor 202 may be configured to execute hard-coded functionality. As such, whether configured by hardware or software methods, or by a combination thereof, processor 202 may represent an entity (e.g., physically embodied in circuitry) capable of performing operations according to embodiments of the present disclosure while configured accordingly. Alternatively, or additionally, processor 202 may be embodied as an executor of software instructions, and the instructions may specifically configure the processor 202 to perform the various algorithms embodied in one or more operations described herein when such instructions are executed. In some embodiments, the processor 202 includes hardware, software, firmware, and/or a combination thereof that performs one or more operations described herein.

In some embodiments, the processor 202 (and/or co-processor or any other processing circuitry assisting or otherwise associated with the processor) is/are in communication with the memory 204 via a bus for passing information among components of the apparatus 200.

Memory 204 or memory circuitry embodying the memory 204 may be non-transitory and may include, for example, one or more volatile and/or non-volatile memories. In some embodiments, the memory 204 includes or embodies an electronic storage device (e.g., a computer readable storage medium). In some embodiments, the memory 204 is configured to store information, data, content, applications, instructions, or the like, for enabling an apparatus 200 to carry out various operations and/or functions in accordance with example embodiments of the present disclosure.

Input/output circuitry 206 may be included in the apparatus 200. In some embodiments, input/output circuitry 206 may provide output to the user and/or receive input from a user. The input/output circuitry 206 may be in communication with the processor 202 to provide such functionality. The input/output circuitry 206 may comprise one or more user interface(s). In some embodiments, a user interface may include a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more operations and/or functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a computing device and/or other display associated with a user.

Communications circuitry 208 may be included in the apparatus 200. The communications circuitry 208 may include any means such as a device or circuitry embodied in either hardware or a combination of hardware and software that is configured to receive and/or transmit data from/to a network and/or any other device, circuitry, or module in communication with the apparatus 200. In some embodiments the communications circuitry 208 includes, for example, a network interface for enabling communications with a wired or wireless communications network. Additionally or alternatively, the communications circuitry 208 may include one or more network interface card(s), antenna(s), bus(es), switch(es), router(s), modem(s), and supporting hardware, firmware, and/or software, or any other device suitable for enabling communications via one or more communications network(s). In some embodiments, the communications circuitry 208 may include circuitry for interacting with an antenna(s) and/or other hardware or software to cause transmission of signals via the antenna(s) and/or to handle receipt of signals received via the antenna(s). In some embodiments, the communications circuitry 208 enables transmission to and/or receipt of data from a user device and/or other external computing device(s) in communication with the apparatus 200.

Function definition circuitry 210 may be included in the apparatus 200 (e.g., an apparatus specifically corresponding to the format conversion system 140). The function definition circuitry 210 may include hardware, software, firmware, and/or a combination thereof, designed and/or configured to request, receive, process, generate, and transmit data, data structures, control signals, and electronic information for maintaining a user-configurable, extendable format conversion library, including performing any of the operations described herein with respect to receiving function definition input and/or generating format conversion functions.

Configuration circuitry 212 may be included in the apparatus 200 (e.g., an apparatus specifically corresponding to the format conversion system 140). The configuration circuitry 212 may include hardware, software, firmware, and/or a combination thereof, designed and/or configured to request, receive, process, generate, and transmit data, data structures, control signals, and electronic information for configuring a format conversion function library for operation with particular operational system(s) 110, including performing any of the operations described herein with respect to receiving site configuration input and/or generating a data source mapping.

Validation circuitry 214 may be included in the apparatus 200 (e.g., an apparatus specifically corresponding to the format conversion system 140). The validation circuitry 214 may include hardware, software, firmware, and/or a combination thereof, designed and/or configured to request, receive, process, generate, and transmit data, data structures, control signals, and electronic information for validating format conversion functions, including performing any of the operations described herein with respect to performing one or more validation operations with respect to format conversion functions.

Routing circuitry 216 may be included in the apparatus 200 (e.g., an apparatus specifically corresponding to the format conversion system 140). The routing circuitry 216 may include hardware, software, firmware, and/or a combination thereof, designed and/or configured to request, receive, process, generate, and transmit data, data structures, control signals, and electronic information for routing raw data from particular sources for conversion via corresponding format conversion functions, including performing any of the operations described herein with respect to reading and utilizing conversion routing metadata, reading and utilizing a data source mapping, and/or generating and transmitting format conversion requests.

Conversion circuitry 218 may be included in the apparatus 200 (e.g., an apparatus specifically corresponding to the format conversion system 140). The conversion circuitry 218 may include hardware, software, firmware, and/or a combination thereof, designed and/or configured to request, receive, process, generate, and transmit data, data structures, control signals, and electronic information for converting raw data from an original format to a normalized format, including performing any of the operations described herein with respect to receiving and processing format conversion requests, invoking and/or executing format conversion functions from the format conversion function library, and/or outputting and/or returning normalized data.

In some embodiments, two or more of the sets of circuitries 202-218 are combinable. Alternatively, or additionally, one or more of the sets of circuitry 202-218 perform some or all of the operations and/or functionality described herein as being associated with another circuitry. In some embodiments, two or more of the sets of circuitry 202-218 are combined into a single module embodied in hardware, software, firmware, and/or a combination thereof. For example, in some embodiments, one or more of the sets of circuitry, for example the function definition circuitry 210, may be combined with the processor 202, such that the processor 202 performs one or more of the operations described herein with respect the function definition circuitry 210.

FIG. 3 is an illustration of an example format conversion system 140, in accordance with at least some example embodiments of the present disclosure. Specifically, FIG. 3 includes schematic depictions of the example format conversion system 140, including example internal processes and components of the format conversion system 140, and/or schematic depictions of the one or more data repositories 150, the enterprise management system 120, and the operational system(s) 110 in communication with the format conversion system 140, along with example data objects used by and/or produced by the depicted processes, components, and/or systems. The format conversion system 140 and/or apparatuses 200 associated therewith, for example, may be specially configured via hardware, software, firmware, and/or a combination thereof, to perform the various data processing and interactions described with respect to FIG. 3 to provide a user-configurable, extendable library of data format conversion functions for converting raw data from any number of original formats to at least one normalized format.

In the illustrated example, the format conversion system 140 comprises a function definition process 302, a function definition interface 304, a function validation process 310, a configuration process 316, a configuration interface 318, one or more gateway processes 324, a routing process 332, one or more conversion processes 336, and/or one or more format conversion interfaces 338. Additionally, the one or more data repositories 150 comprise, in some examples, a format conversion function library 314 and/or one or more enterprise data stores 346.

In various embodiments, the format conversion system 140 may be configured to perform and/or facilitate generation of a library of format conversion functions. More particularly, in some embodiments, the function definition process 302 of the format conversion system 140 may be configured to present the function definition interface 304, which may be configured to receive function definition input 306 (e.g., from and/or based on input received and/or detected by the enterprise management system 120 and/or user device(s) 160). For example, the function definition process 302 may be configured to present the function definition interface 304 by exposing an application programming interface (API) configured to receive data (of the function definition input 306) indicative of a definition of a function for converting from an original data format to a normalized data format. Additionally or alternatively, the function definition process 302 may be configured to present the function definition interface 304 within a GUI rendered on one or more displays of one or more of the user devices 160, the function definition interface 304 comprising one or more interactable elements configured to receive input or selections (of the function definition input 306) indicative of a definition of a function for converting from an original data format to a normalized data format. Moreover, in some embodiments, the function definition process 302 may be configured to generate one or more conversion functions 308 based at least in part on the function definition input 306 received via the function definition interface 304, for example, by translating and/or converting the function definition input 306 into a format that can be stored, called, and executed, including possibly reformatting the data indicative of a definition of a conversion function and/or generating metadata associated with the conversion function. In one example, the function definition process 302 may generate the conversion functions 308 to comprise the definitions of conversion functions indicated by the function definition input 306, expressed in a format such that the conversion functions can be stored, called, and executed, along with additional metadata for enabling and/or facilitating storage, calling, and/or execution of the conversion function. In some embodiments, the conversion functions 308 may be added to the format conversion function library 314 and/or stored in the one or more data repositories 150 for later invocation and execution.

In various embodiments, the function definition input 306 received via the function definition interface 304 and/or the conversion functions 308 generated with respect to the function definition input 306 may comprise data (e.g., text data, object attribute data) indicative of a definition of a function for converting from an original data format to a normalized data format. For example, the function definition input 306 and/or conversion function 308 derived therefrom may comprise text data and/or object attribute data containing instructions defining and/or characterizing one or more operations to be performed with respect to given raw data in order to convert the given raw data from an original format (according to which the original raw data is formatted) into a normalized format (according to which normalized data output as a result of the conversion operation(s) is formatted). The instructions may be textual instructions expressed in a scripting language, which may be one of one or more predetermined scripting languages associated with the format conversion system 140. The function definition input 306 and/or the conversion functions 308 derived therefrom may comprise metadata associated with, identifying, and/or characterizing each defined function, including metadata identifying the original format associated with the function (e.g., the format according to which raw data received as input by the function is formatted, the format that the instructions of the function are configured to convert from) and/or the normalized format associated with the function (e.g., the format according to which normalized data output by the function is formatted, the format that the instructions of the function are configured to convert to).

In various embodiments, the format conversion system 140 may be configured to control which conversion functions 308 are ultimately added to the format conversion function library 314 based on quality, access control, and/or security considerations. More particularly, in some embodiments, the function validation process 310 of the format conversion system 140 may be configured to perform one or more validation operations with respect to the conversion functions 308 defined via the function definition input 306 and/or to add, as validated conversion functions 312, only a subset of the conversion functions 308, namely those that were successfully validated via the validation operation(s). In one example, the validation operation(s) performed by the function validation process 310 with respect to the conversion functions 308 may include validating that a given format conversion function (e.g., of the conversion functions 308) correctly converts raw data from the particular original data format associated with the given format conversion function into the particular normalized data format associated with the given format conversion function. In another example, the validation operation(s) performed by the function validation process 310 with respect to the conversion functions 308 may include validating that a given format conversion function (e.g., of the conversion functions 308) does not attempt to cause performance of an operation that is unauthorized in a present context (e.g., access data, libraries, and/or functions that are associated with a tenant and/or account different from that from or within which the function is being added, access data, libraries, and/or functions that are designated as and/or determined to be restricted with respect to a tenant and/or account from or within which the function is being added). In another example, the validation operation(s) performed by the function validation process 310 with respect to the conversion functions 308 may include validating that a given format conversion function (e.g., of the conversion functions 308) does not cause certain harmful and/or malicious operations to be performed as a result of subsequent processing of normalized data output by the given format conversion function (e.g., by determining whether any keywords, code portions, commands, and/or operators or sequences thereof pertaining to known malicious or harmful code segments are present in the definition of the given format conversion function).

In some embodiments, the validated conversion functions 312 comprises only a subset of the conversion functions 308 that were successfully validated via the validation operation(s) performed by the function validation process 310. The validated conversion functions 312 may be added to the format conversion function library 314 and/or stored in the one or more data repositories 150 for later invocation and execution. In some embodiments, only the validated conversion functions 312 may be added to the format conversion function library 314 and/or only the validated conversion functions 312 may be included among the functions made available for invocation via the format conversion interface(s) 338 and/or the conversion process(es) 336. Similarly, any of the conversion functions 308 that were not successfully validated may be excluded from among the functions added to the format conversion function library 314 and/or any of the conversion functions 308 that were not successfully validated may be excluded from among the functions made available for invocation via the format conversion interface(s) 338 and/or the conversion process(es) 336.

In various embodiments, the format conversion function library 314 may be a repository of conversion functions 308 and/or validated conversion functions 312. In some embodiments, the functions may be stored in non-volatile memory (e.g., of the one or more data repositories 150) as part of the format conversion function library 314 in a manner such that other processes (e.g., of the format conversion system 140) may invoke a selected function for execution from among all of the functions within the format conversion function library 314. In some embodiments, the format conversion function library is partitioned among a plurality of tenants (e.g., users and/or user accounts, and/or groups thereof), with each tenant having access to a particular partition of the format conversion function library 314 to which the tenant is associated (e.g., a particular partition containing any public conversion functions and/or any of the conversion functions 308 and/or validated conversion functions 312 that were generated by and/or in connection with that tenant).

In some embodiments, at least a subset of the conversion functions 308 (and/or validated conversion functions 312) contained in the format conversion function library 314 are each associated with a different original data format from a plurality of different original data formats.

Moreover, in some embodiments, at least a subset of the conversion functions 308 (and/or validated conversion functions 312) contained in the format conversion function library 314 are each associated with a different normalized data format from a plurality of different normalized data formats.

In various embodiments, the format conversion system 140 may be configured to perform and/or facilitate configuration of particular sites, operational systems 110, and/or components or groups thereof, to use the format conversion function library 314. More particularly, in some embodiments, the configuration process 316 of the format conversion system 140 may be configured to present the configuration interface 320, which may be configured to receive site configuration input 320 (e.g., from and/or based on input received and/or detected by the enterprise management system 120 and/or user device(s) 160). For example, the configuration process 316 may be configured to present the configuration interface 318 by exposing an API configured to receive data (of the site configuration input 320) indicative of input and/or selections defining, for example, how raw data from particular data sources (e.g., operational systems 110 and/or components or devices thereof) should be processed by the format conversion system 140. Additionally or alternatively, the configuration process 316 may be configured to present the configuration interface 318 within a GUI rendered on one or more displays of one or more of the user devices 160, the configuration interface 318 comprising one or more interactable elements configured to receive input or selections (of the site configuration input 320) indicative of input and/or selections defining, for example, how raw data from particular data sources (e.g., operational systems 110 and/or components or devices thereof) should be processed by the format conversion system 140. Moreover, in some embodiments, the configuration process 316 may be configured to generate configuration data (e.g., data source mapping 322) based at least in part on the site configuration input 320, including, for example, by translating the data contained in the site configuration input 320 to a format that can be used by other processes of the format conversion system 140 (e.g., routing process 332) to determine how the raw data from particular data sources (e.g., operational systems 110 and/or components or devices thereof) should be processed. The format conversion system 140 may determine how to process raw data from operational system(s) 110 (and/or components or devices thereof) based at least in part on the site configuration input 320 and/or any configuration data (e.g., data source mapping 322) generated by the configuration process 316, including, for example, determining which functions from the format conversion function library 314 to invoke with respect to raw data from each different data source.

In some embodiments, the site configuration input 320 and/or the data source mapping 322 derived therefrom may comprise data indicative of associations between particular data sources (e.g., particular systems, devices, and/or components, particular types or groups of systems, devices, and/or components) and particular conversion functions 308 (and/or validated conversion functions 312) from the format conversion function library 314. For example, in some embodiments, the site configuration input 320 and/or data source mapping 322 may comprise source identifier data identifying the various data sources with respect to a site, operational system 110, group of operational systems 110, and/or sub-systems. The source identifier data may be defined at the level of individual data sources and/or groups of data sources. Each item of the source identifier data may (e.g., uniquely) identify an individual data source and/or a group of data sources. Moreover, the site configuration input 320 and/or data source mapping 322 may comprise format identifier data (e.g., identifying particular original formats) and/or function identifier data (e.g., identifying particular functions from the format conversion function library 314) associated with the source identifier data. In one example, each item of the source identifier data may be associated with a particular original format (identified via the associated format identifier data) and/or a particular function from the format conversion function library 314 (identified via the associated function identifier data). The data source mapping 322 may comprise data sufficient for selecting which function from the format conversion function library 314 to invoke with respect to any given set of raw data from a particular data source, for example, based at least in part on the particular data source.

In one example scenario, enterprise systems, including operational systems 110 and/or computer, software, and/or network systems associated with an enterprise with which the format conversion system 140 and/or enterprise management system 120 is associated may generate, collect, and/or accumulate a body of enterprise data that may contain data from, associated with, and/or relevant to any or all of the enterprise system(s) and/or operational system(s) 110 and/or any processes and/or operations associated therewith. In one example, the enterprise management system 120 (e.g., via the format conversion system 140) may be configured to aggregate, collect, retrieve, generate, capture, receive, request, and/or otherwise gather such data from, associated with, and/or relevant to the enterprise or its systems, including telemetry data generated by, within, and/or with respect to the operational system(s) 110. As previously mentioned, the various data sources within and/or associated with the operational system(s) 110 may each be configured to generate or otherwise transmit the telemetry data in a particular original format specific to that data source (or to a group of data sources to which that data source belongs), from among a plurality of original formats. Accordingly, in the illustrated example, the format conversion system 140 receives raw telemetry data 326 from the operational system(s) 110, which raw telemetry data 326 comprises telemetry data originating from possibly a plurality of data sources and formatted according to one or more of a plurality of possible original formats associated with the data sources. Although the illustrated example concerns telemetry data, it will be appreciated that the format conversion functionality described herein may be applicable to any type of data that can be converted from an original format (e.g., raw data) from a plurality of original formats to a normalized format (e.g., normalized data) and is not limited to specifically telemetry data.

In various embodiments, the format conversion system 140 may be configured to perform and/or facilitate conversion of raw telemetry data 326 from any number of original formats to a normalized format using the format conversion function library 314 and the data source mapping 322.

More particularly, one or more gateway processes 324 may be configured to receive the raw telemetry data 326 from the operational system(s) 110. In one example, each site configured via the configuration process 316 may be associated with a particular gateway process 324 configured to generate conversion routing metadata 330 for any raw telemetry data 326 received by the gateway process 324 based at least in part on and/or identifying the data source from which the received raw telemetry data 326 originated. In some embodiments, the gateway process 324 for a particular site and/or operational system 110 may be executed by a computing device (e.g., edge device, virtual machine) independently connected to each data source at the site and/or within the operational system 110, for example, according to a star topology configuration, such that the gateway process 324 is able to determine the source of any incoming raw telemetry data 326. The gateway process 324 may be configured to generate for each set of raw telemetry data 326 received from a particular data source conversion routing metadata 330 associated with that set of raw telemetry data 326 identifying and/or characterizing the data source from which that set of raw telemetry data 326 originated (e.g., based on the independent connection between the gateway process 324 and the data source).

In various embodiments, each gateway process 324 may be configured to transmit and/or relay raw data units 328 comprising the raw telemetry data 326 along with the associated conversion routing metadata 330 generated for each raw data unit 328. In some embodiments, each raw data unit 328 may be specific to a particular data source such that each raw data unit 328 comprises only raw telemetry data 326 that is from the particular data source, and the gateway process 324 may be configured to generate a particular item or instance of the conversion routing metadata 330 specific to that particular data source identifying the particular data source. In some embodiments, the raw data units 328 may each correspond to an individual network unit used to transmit the raw data to the routing process 332, such as packets, fragments, frames, datagrams, and/or segments, to list a few examples. Additionally or alternatively, each raw data unit 328 may comprise the conversion routing metadata 330 that was generated with respect to the portion of raw telemetry data 326 comprised by the raw data unit 328.

Moreover, in various embodiments, the routing process 332 of the format conversion system 140 may be configured to receive the raw data units 328 and the conversion routing metadata 330 associated with the raw data units 328. For each particular raw data unit 328, the routing process 332 may be configured to select a format conversion function (e.g., from the functions of the format conversion function library 314) for the particular raw data unit 328 based at least in part on the format conversion routing metadata 330 associated with the particular raw data unit 328 and/or based at least in part on the data source mapping 322. For instance, the routing process 332 may cross-reference the conversion routing metadata 330 with the data source mapping 322 and/or other data by, for example, determining from the conversion routing metadata 330 the data source associated with a particular raw data unit 328, determining from the data source mapping 322 which original format and/or which format conversion function is associated with that data source, and selecting the format conversion function from the format conversion function library 314 that is associated with the original data format according to which the raw data of the particular raw data packet 328 is formatted (e.g., the function that is associated with the original data format indicated for the data source in the data source mapping 322, the function that is directly associated with the data source in the data source mapping 322).

In some embodiments, in response to selection of the format conversion function for a particular raw data unit 328, the routing process 332 may be configured to cause execution of the selected format conversion function with respect to the particular raw data unit. For example, the routing process 332 may be configured to generate a format conversion request 334 for each raw data unit 328, the format conversion request 334 comprising, for example, metadata identifying the selected format conversion function and/or invocation data indicating an address (e.g., for an API) or other identifier used to invoke the selected format conversion function. In some embodiments, the routing process 332 may generate the format conversion request 334 to comprise the corresponding raw data unit 328 and may transmit each format conversion request 334 to a format conversion interface 338 associated with the selected format conversion function (e.g., to a format conversion interface 338 specific to the selected format conversion function). In some embodiments, the routing process 332 may relay each raw data unit 328 (as a format conversion request 334) to a different format conversion interface 338 or invocation destination associated with the selected format conversion function based on the conversion routing metadata 330, without, for example, having to generate an additional data object.

In some embodiments, the routing process 332 may be configured to select the format conversion function for each particular raw data unit 328 and cause execution of the selected format conversion function with respect to the particular raw data unit only in response to determining that the format conversion routing metadata 330 associated with the particular raw data unit 328 indicates that the portion of the raw telemetry data 326 comprised by the particular raw data unit 328 requires conversion to a normalized data format. In one example, the routing process 332 may be configured to select and execute the format conversion function for a particular raw data unit 328 only in response to determining that format conversion routing metadata 330 associated with the particular raw data unit 328 is present and otherwise to disregard a particular raw data unit 328 and/or a particular portion of the raw telemetry data 326 (e.g., in a data stream such as a telemetry stream) in response to determining that no format conversion routing metadata 330 associated with the particular raw data unit 328 and/or the particular portion of the raw telemetry data 326 is present or accessible to the routing process 332.

In some embodiments, the routing process 332 may be configured to select the format conversion function for each particular raw data unit 328 and cause execution of the selected format conversion function with respect to the particular raw data unit only in response to determining, based at least in part on the format conversion routing metadata 330, that a format conversion function has been defined with respect to the data source from which the portion of raw telemetry data 326 comprised by the particular raw data unit 328. In one example, the routing process 332 may be configured to select and execute the format conversion function for a particular raw data unit 328 only in response to determining that a format conversion function associated with the particular raw data unit 328 exists in the format conversion function library 314 and/or is associated with the data source (e.g., in the data source mapping 322) and otherwise to disregard a particular raw data unit 328 and/or a particular portion of the raw telemetry data 326 (e.g., in a data stream such as a telemetry stream) in response to determining that no format conversion function associated with the particular raw data unit 328 exists in the format conversion function library 314 and/or is associated with the data source (e.g., in the data source mapping 322).

Moreover, in various embodiments, the conversion process(es) 336 of the format conversion system 140 may be configured to present the format conversion interface(s) 338, for example, by exposing an API configured to receive the raw data units 328 and/or the format conversion requests 334 from the routing process 332. In some embodiments, the conversion process(es) 336 may be configured to present a particular format conversion interface 338 specific to each format conversion function in the format conversion function library 314 and, for each particular format conversion interface 338, to invoke the format conversion function with which the format conversion interface 338 is associated in response to receiving a format conversion request 334 via that particular format conversion interface 338. In some embodiments, the conversion process(es) 336 may be configured to present a singular format conversion interface 338 and, for each format conversion request 334 received via the singular format conversion interface 338, to invoke the format conversion function identified (e.g., via metadata) in the format conversion request 334. Moreover, in some embodiments, the conversion process(es) 336 may be configured to present the format conversion interface(s) 338 only with respect to the validated conversion functions 312 or a subset of the conversion functions 308 that were successfully validated via the validation operation(s) performed by the function validation process 310.

The conversion process(es) 336 may be configured, in response to receiving each particular format conversion request 334 via the format conversion interface(s) 338, to retrieve and/or access a corresponding invoked conversion function 340 from the format conversion function library 314 (e.g., the selected format conversion function determined by the routing process 332 and/or indicated in the format conversion request 334 and/or by virtue of which format conversion interface 338 received the request) and to execute the invoked format conversion function 340. In some embodiments, the conversion process(es) 336 may be configured to execute the invoked format conversion function 340 by executing the various operations indicated in the instructions defined for the invoked conversion function 340 with respect to the portion of the raw telemetry data 326 comprised by the raw data unit 328 pertaining to the format conversion request 334 in response to which the format conversion function has been invoked, including, for example, converting the raw data (formatted according to an original data format) into normalized data 342 (formatted according to a normalized data format). Additionally or alternatively, the conversion process(es) 336 may be configured to output (e.g., as a result of the executed operations indicated in the instructions defined for the invoked conversion function) normalized data 342 corresponding to the portion of raw telemetry data 326 comprised by the raw data unit 328 pertaining to the format conversion request 334 in response to which the format conversion function has been invoked, the normalized data 342 being a normalized instance of the corresponding raw data and being formatted according to the normalized data format associated with the invoked conversion function 340.

In some embodiments, one or more of the raw data units 328 may be converted into the normalized telemetry data 342 by a plurality of different invoked conversion functions 340, which may be executed in parallel and/or in sequence with respect to each other. In one example, based at least in part on the conversion routing metadata 330, raw data may be input into a plurality of invoked conversion functions 340 in parallel. In another example, raw data may be input into a first invoked conversion function 340, with the normalized telemetry data 342 generated via the first invoked conversion function being input (e.g., along with additional conversion routing metadata 330 generated by the first invoked conversion function) into one or more succeeding format conversion functions. In this way, for example, an instance of data (e.g., embodied by raw data in an initial state and by one or more instances of normalized data in one or more succeeding states) may loop back through the format conversion system 140 any number of times.

In various embodiments, the format conversion system 140 may be configured to cause performance of one or more enterprise management operations 344 based at least in part on the normalized data 342 output by the conversion process(es) 336 as a result of execution of the invoked conversion functions 312. In one example, the format conversion system 140 may be configured to transmit (or otherwise make available) the normalized telemetry data 342 to the enterprise management system 120, which may be configured to perform the enterprise management operation(s) 344 based at least in part on and/or in response to receiving the normalized telemetry data 342. In some embodiments, the enterprise management operation(s) 344 may include storing the normalized telemetry data 342 in the one or more data repositories 150, for example, in one or more enterprise data stores 346 associated with the operational system(s) 110, enterprise management system 120, and/or format conversion system 140. Moreover, in some embodiments, format conversion system 140 may be configured to insert the normalized telemetry data 342 into a data stream (e.g., telemetry stream) associated with the corresponding raw telemetry data 326 and/or raw data units 328, including, for example, a data stream from which the corresponding raw telemetry data 326 and/or raw data units 328 were extracted, an alternate data stream, a new data stream, and/or an existing data stream, to list a few examples. Subsequent processes and/or sub-systems (e.g., of the enterprise management system 120) may be configured to access the normalized telemetry data 342 via the data stream and/or to perform further enterprise management operation(s) 344 based at least in part on the normalized telemetry data 342 inserted into the data stream. In one example, the enterprise management operation(s) 344 may comprise one or more automation processes for automatically controlling configuration of and/or behavior of assets and/or equipment of the operational system(s) 110, which processes and/or components may be configured to control the configuration of and/or behavior of the assets and/or equipment based at least in part on the normalized telemetry data 342. In another example, the enterprise management operation(s) 344 may comprise one or more analytics processes for analyzing data (e.g., normalized telemetry data 342 and/or any data derived therefrom) and determining and/or presenting insights concerning performance of the various operational system(s) 110 and/or related processes or operations, which processes and/or components may be configured to determine and/or present (e.g., via the user devices 160) the insights based at least in part on the normalized telemetry data 342 and/or to include data derived therefrom.

Having described example systems and/or apparatuses of the present disclosure, example flowcharts including various operations performed by the apparatuses and/or systems described herein will now be discussed. It should be appreciated that each of the flowcharts depicts an example computer-implemented process that may be performed by one or more of the apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur in-between one or more blocks of another process, before one or more blocks of another process, and/or otherwise operates as a sub-process of a second process. Additionally or alternatively, any of the processes may include some or all of the steps described and/or depicted, including one or more optional operational blocks in some embodiments. With respect to the flowcharts discussed below, one or more of the depicted blocks may be optional in some, or all, embodiments of the disclosure. Similarly, it should be appreciated that one or more of the operations of each flowchart may be combinable, replaceable, and/or otherwise altered as described herein.

FIGS. 4 and 5 illustrate flowcharts including operational blocks of example processes in accordance with at least some example embodiments of the present disclosure. In some embodiments, the computer-implemented processes of FIGS. 4 and 5 are each embodied by computer program code stored on a non-transitory computer-readable medium of a computer program product configured for execution to perform the computer-implemented method. Alternatively or additionally, in some embodiments, the example processes of FIGS. 4 and 5 are performed by one or more specially configured computing devices, such as the specially configured apparatus 200 (e.g., via function definition circuitry 210, configuration circuitry 212, validation circuitry 214, routing circuitry 216, and/or conversion circuitry 218). In this regard, in some such embodiments, the apparatus 200 is specially configured by computer program instructions stored thereon, for example in the memory 204 and/or another component depicted and/or described herein, and/or otherwise accessible to the apparatus 200, for performing the operations as depicted and described with respect to the example processes of FIGS. 4 and 5. In some embodiments, the specially configured apparatus 200 includes and/or otherwise is in communication with one or more external apparatuses, systems, devices, and/or the like, to perform one or more of the operations as depicted and described. While the operational blocks of each of the example processes are depicted in each of FIGS. 4 and 5 in a particular order, this should not be understood as requiring that such operations be performed in the particular order shown or in sequential order, or that all illustrated operations be performed.

FIG. 4 illustrates a flowchart including operational blocks of an example process 400 for routing format conversion requests and/or raw data to a selected format conversion function from a plurality of format conversion functions, in accordance with at least some example embodiments of the present disclosure.

The process 400 begins at operation 402, at which an apparatus (such as, but not limited to, the apparatus 200 or circuitry thereof as described above in connection with FIG. 2) presents a configuration interface configured to receive configuration input with respect to a particular site, operational system, and/or component thereof. In various embodiments, the configuration interface presented at operation 402 may correspond to and/or comprise the configuration interface 318 as defined and described with respect to FIG. 3, and presenting the configuration interface at operation 402 may comprise some or all of the analogous functionality attributed to the configuration process 316 as described with respect to FIG. 3.

At operation 404 of the process 400, an apparatus (such as, but not limited to, the apparatus 200 or circuitry thereof described above in connection with FIG. 2) receives configuration input via the configuration interface presented at operation 402. In various embodiments, the configuration input received at operation 404 may correspond to and/or comprise the site configuration input 320 as defined and described with respect to FIG. 3, and receiving the configuration input at operation 404 may comprise some or all of the analogous functionality attributed to the configuration process 316 as described with respect to FIG. 3.

At operation 406 of the process 400, an apparatus (such as, but not limited to, the apparatus 200 or circuitry thereof described above in connection with FIG. 2) generates a data source mapping based at least in part on the configuration input received at operation 404. In various embodiments, the data source mapping generated at operation 406 may correspond to and/or comprise the data source mapping 322 as defined and described with respect to FIG. 3, and generating the data source mapping at operation 406 may comprise some or all of the analogous functionality attributed to the configuration process 316 as described with respect to FIG. 3.

At operation 408 of the process 400, an apparatus (such as, but not limited to, the apparatus 200 or circuitry thereof described above in connection with FIG. 2) receives raw data units comprising raw data, which raw data is formatted according to a particular original data format corresponding to a source of the raw data. In various embodiments, the raw data units received at operation 408 may correspond to and/or comprise the raw telemetry data 326 and/or the raw data units 328 as defined and described with respect to FIG. 3, and receiving the raw data units at operation 408 may comprise some or all of the analogous functionality attributed to the gateway process(es) 324 and/or the routing process 332 as described with respect to FIG. 3. Additionally or alternatively, the raw data comprised by the raw data units received at operation 408 may correspond to and/or comprise the raw telemetry data 326 as defined and described with respect to FIG. 3. Additionally or alternatively, the source of the raw data referred to with respect to operation 408 may correspond to the operational system(s) 110 and/or any components and/or devices thereof, as defined and described with respect to FIGS. 1 and 3.

At operation 410 of the process 400, an apparatus (such as, but not limited to, the apparatus 200 or circuitry thereof described above in connection with FIG. 2) generates format conversion routing metadata for each raw data unit received at operation 408 based at least in part on the source of the raw data comprised by the raw data unit. In various embodiments, the format conversion routing metadata generated at operation 408 may correspond to and/or comprise the conversion routing metadata 330 as defined and described with respect to FIG. 3, and generating the format conversion routing metadata at operation 410 may comprise some or all of the analogous functionality attributed to the gateway process(es) 324 as described with respect to FIG. 3.

At operation 412 of the process 400, an apparatus (such as, but not limited to, the apparatus 200 or circuitry thereof described above in connection with FIG. 2), for each particular raw data unit of those received at operation 408, selects a format conversion function for the particular raw data unit from a plurality of format conversion functions based at least in part on the format conversion routing metadata associated with the particular raw data unit (e.g., and generated at operation 410). In various embodiments, each format conversion function of the plurality of format conversion functions is configured to convert the raw data comprised by a given raw data unit from the particular original data format associated with the format conversion function into a particular normalized data format associated with the format conversion function. In some embodiments, the plurality of format conversion functions from which the selection is made at operation 412 may correspond to and/or comprise the conversion functions 308, the validated conversion functions 312, and/or any of functions of the format conversion function library 314 as defined and described with respect to FIG. 3. Additionally or alternatively, the format conversion function selected at operation 412 may correspond to the selected format conversion function indicated in and/or with respect to the format conversion requests 334 as defined and described with respect to FIG. 3, and selecting the format conversion function at operation 412 may comprise some or all of the analogous functionality attributed to the routing process 332 as described with respect to FIG. 3.

Moreover, the format conversion function for each particular raw data unit may be selected at operation 412 based at least in part on a mapping of sources of the raw data of the raw data units each to an associated format conversion function (and/or an associated original format) of the plurality of format conversion functions. Here, the mapping may correspond to and/or comprise the data source mapping generated at operation 406.

At operation 414 of the process 400, an apparatus (such as, but not limited to, the apparatus 200 or circuitry thereof described above in connection with FIG. 2), for each particular raw data unit of those received at operation 408, causes execution of the format conversion function selected for that particular raw data unit at operation 412 with respect to the particular raw data unit. In various embodiments, execution of the selected format conversion function with respect to the particular raw data unit at operation 414 may output normalized data that is a normalized instance of the raw data comprised by the particular raw data unit, which normalized data may be formatted according to a normalized data format associated with the selected format conversion function. In some embodiments, the format conversion function(s) caused to be executed at operation 414 may correspond to and/or comprise the invoked conversion functions 340 as defined and described with respect to FIG. 3, and causing the execution of the format conversion function(s) at operation 414 may comprise some or all of the analogous functionality attributed to the routing process 332 and/or the conversion process(es) 336 as described with respect to FIG. 3. Additionally or alternatively, the normalized data output at operation 414 may correspond to and/or comprise the normalized telemetry data 342 as defined and described with respect to FIG. 3, and outputting the normalized data at operation 414 may comprise some or all of the analogous functionality attributed to the conversion process(es) 336 as described with respect to FIG. 3.

At operation 416 of the process 400, an apparatus (such as, but not limited to, the apparatus 200 or circuitry thereof described above in connection with FIG. 2) inserts the normalized data output at operation 414 into a data stream (e.g., telemetry stream) associated with a raw data unit (e.g., of those received at operation 408) corresponding to the normalized data, such as, for example, a data stream from which the raw data unit was extracted, a new data stream associated with the raw data unit, and/or an existing alternate data stream associated with the raw data unit, to list a few examples.

FIG. 5 illustrates a flowchart including operational blocks of an example process 500 for using functions from a format conversion function library to convert raw data from an original format to a normalized format, in accordance with at least some example embodiments of the present disclosure.

The process 500 begins at operation 502, at which an apparatus (such as, but not limited to, the apparatus 200 or circuitry thereof as described above in connection with FIG. 2) presents a format conversion function definition interface configured to receive format conversion function definition input with respect to a plurality of original data formats and/or one or more normalized or standardized data formats. In various embodiments, the format conversion function definition interface presented at operation 502 may correspond to and/or comprise the function definition interface 304 as defined and described with respect to FIG. 3, and presenting the format conversion function definition interface at operation 502 may comprise some or all of the analogous functionality attributed to the function definition process 302 as described with respect to FIG. 3. Moreover, the format conversion function definition input referenced with respect to operation 502 may correspond to and/or comprise the function definition input 306 as defined and described with respect to FIG. 3.

At operation 504 of the process 500, an apparatus (such as, but not limited to, the apparatus 200 or circuitry thereof described above in connection with FIG. 2) receives the format conversion function definition input (as defined with respect to operation 502) via the format conversion function definition interface presented at operation 502. In various embodiments, the format conversion function definition input received at operation 504 may define a plurality of format conversion functions, each of which may be associated with a corresponding original data format of a plurality of original data formats and a corresponding normalized data format, and each format conversion function, of the plurality of format conversion functions defined via the received format conversion function definition input, is configured to convert given raw data from a particular original data format associated with the format conversion function into a particular normalized data format associated with the format conversion function. In some embodiments, receiving the format conversion function definition input at operation 504 may comprise some or all of the analogous functionality attributed to the function definition process 302 as described with respect to FIG. 3. Additionally or alternatively, the plurality of format conversion functions defined via the format conversion function definition input received at operation 504 may correspond to and/or comprise the conversion functions 308 as defined and described with respect to FIG. 3.

At operation 506 of the process 500, an apparatus (such as, but not limited to, the apparatus 200 or circuitry thereof described above in connection with FIG. 2) performs at least one validation operation with respect to the plurality of format conversion functions defined via the format conversion function definition input received at operation 504. In various embodiments, the validation operation(s) performed at operation 506 may include validating that a given format conversion function correctly converts raw data from the particular original data format associated with the given format conversion function into the particular normalized data format associated with the given format conversion function, validating that a given format conversion function does not attempt to cause performance of an operation that is unauthorized in a present context (e.g., access data, libraries, and/or functions that are associated with a tenant and/or account different from that from or within which the function is being added, access data, libraries, and/or functions that are designated as and/or determined to be restricted with respect to a tenant and/or account from or within which the function is being added), and/or validating that a given format conversion function does not cause certain harmful and/or malicious operations to be performed as a result of subsequent processing of normalized data output by the given format conversion function (e.g., by determining whether any keywords, code portions, commands, and/or operators or sequences thereof pertaining to known malicious or harmful code segments are present in the definition of the given format conversion function), to list a few examples. In some embodiments, performing the validation operation(s) at operation 506 may comprise some or all of the analogous functionality attributed to the function validation process 310 as described with respect to FIG. 3.

At operation 508 of the process 500, an apparatus (such as, but not limited to, the apparatus 200 or circuitry thereof described above in connection with FIG. 2) stores the format conversion functions (e.g., defined via the format conversion function definition input received at operation 504 and/or validated at operation 506) as part of a format conversion function library. In some embodiments, only the format conversion functions that were successfully validated at operation 506 are added to the format conversion function library, while any that were not successfully validated are not added to the format conversion function library, and these successfully validated format conversion functions may correspond to and/or comprise the validated conversion functions 312 as defined and described with respect to FIG. 3. Additionally or alternatively, the format conversion function library referenced with respect to operation 508 may correspond to and/or comprise the format conversion function library 314 as defined and described with respect to FIG. 3.

At operation 510 of the process 500, an apparatus (such as, but not limited to, the apparatus 200 or circuitry thereof described above in connection with FIG. 2) presents at least one format conversion interface configured to receive format conversion requests with respect to the plurality of format conversion functions defined via the format conversion function definition input received at operation 504 and/or the format conversion functions contained by the format conversion function library referenced with respect to operation 508. In various embodiments, the format conversion interface(s) may be presented at operation 510 only with respect to a subset of the plurality of format conversion functions that were successfully validated via the validation operation(s) performed at operation 506. Additionally or alternatively, the format conversion interface(s) presented at operation 510 may correspond to and/or comprise the format conversion interface(s) 338 as defined and described with respect to FIG. 3, and presenting the format conversion interface(s) at operation 510 may comprise some or all of the analogous functionality attributed to the conversion process(es) as described with respect to FIG. 3. Additionally or alternatively, the format conversion requests referenced with respect to operation 510 may correspond to and/or comprise the format conversion requests 334 and/or the raw data units 328 as defined and described with respect to FIG. 3.

At operation 512 of the process 500, an apparatus (such as, but not limited to, the apparatus 200 or circuitry thereof described above in connection with FIG. 2) receives the format conversion requests (defined and referenced with respect to operation 510) via the format conversion interface(s) presented at operation 510. In various embodiments, receiving the format conversion requests at operation 512 may comprise some or all of the analogous functionality attributed to the conversion process(es) 336 as described with respect to FIG. 3.

At operation 514 of the process 500, an apparatus (such as, but not limited to, the apparatus 200 or circuitry thereof described above in connection with FIG. 2), in response to receiving each particular format conversion request of the format conversion requests received at operation 512, executes a selected format conversion function, of the plurality of format conversion functions defined via the format conversion function definition input received at operation 504 and/or the format conversion functions contained by the format conversion function library referenced with respect to operation 508, the selected and executed format conversion function being associated with the original data format of the raw data comprised by the particular format conversion request. In various embodiments, execution of the selected format conversion function at operation 514 outputs normalized data corresponding to the raw data of the particular format conversion request, the normalized data being a normalized instance of the corresponding raw data and being formatted according to the normalized data format associated with the selected and executed format conversion function.

In some embodiments, the selected format conversion function executed for each particular format conversion request at operation 514 may correspond to and/or comprise the format conversion function selected at operation 412 of the process 400 as defined and described with respect to FIG. 4. Similarly, in some embodiments, executing the selected format conversion function at operation 514 may correspond to, may comprise, and/or may be comprised by the execution of the selected format conversion function referenced at operation 414 of the process 400 as defined and described with respect to FIG. 4.

Additionally or alternatively, the selected format conversion function executed for each particular format conversion request at operation 514 may correspond to and/or comprise the invoked conversion functions 340 as defined and described with respect to FIG. 3, and executing the format conversion function(s) at operation 514 may comprise some or all of the analogous functionality attributed to the routing process 332 and/or the conversion process(es) 336 as described with respect to FIG. 3. Additionally or alternatively, the normalized data output at operation 514 may correspond to and/or comprise the normalized telemetry data 342 as defined and described with respect to FIG. 3, and outputting the normalized data at operation 514 may comprise some or all of the analogous functionality attributed to the conversion process(es) 336 as described with respect to FIG. 3.

At operation 516 of the process 500, an apparatus (such as, but not limited to, the apparatus 200 or circuitry thereof described above in connection with FIG. 2) causes performance of at least one enterprise management operation based at least in part on the normalized data output at operation 514. In various embodiments, the enterprise management operation caused to be performed at operation 516 may correspond to and/or comprise the enterprise management operation(s) 344 as defined and described with respect to FIG. 3.

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communications network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communications network. Examples of communications networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communications network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed is:

1. An apparatus comprising at least one processor and at least one non-transitory memory comprising program code stored thereon, wherein the at least one non-transitory memory and the program code are configured to, with the at least one processor, cause the apparatus to at least:

receive raw data units and format conversion routing metadata associated with the raw data units, wherein raw data comprised by each raw data unit is formatted according to a particular original data format corresponding to a source of the raw data;

for each particular raw data unit of the received raw data units, select a format conversion function for the particular raw data unit from a plurality of format conversion functions based at least in part on the format conversion routing metadata associated with the particular raw data unit, wherein each format conversion function of the plurality of format conversion functions is configured to convert the raw data comprised by a given raw data unit from the particular original data format associated with the format conversion function into a particular normalized data format associated with the format conversion function; and cause execution of the selected format conversion function with respect to the particular raw data unit, wherein execution of the selected format conversion function with respect to the particular raw data unit outputs normalized data that is a normalized instance of the raw data comprised by the particular raw data unit, which normalized data is formatted according to the normalized data format associated with the selected format conversion function.

2. The apparatus of claim 1, wherein the at least one non-transitory memory and the program code are configured to, with the at least one processor, further cause the apparatus to at least:

generate the format conversion routing metadata for each raw data unit based at least in part on the source of the raw data comprised by the raw data unit.

3. The apparatus of claim 1, wherein the at least one non-transitory memory and the program code are configured to, with the at least one processor, further cause the apparatus to at least:

insert the normalized data output for each corresponding raw data unit into a data stream associated with the raw data unit.

4. The apparatus of claim 1, wherein at least a subset of the plurality of format conversion functions are each associated with a different original data format from a plurality of different original data formats.

5. The apparatus of claim 1, wherein selecting the format conversion function for each particular raw data unit comprises selecting the format conversion function that is associated with the original data format according to which the raw data of the particular raw data unit is formatted.

6. The apparatus of claim 1, wherein selecting the format conversion function for each particular raw data unit is based at least in part on a mapping of sources of the raw data of the raw data units each to an associated format conversion function of the plurality of format conversion functions.

7. The apparatus of claim 6, wherein the format conversion routing metadata associated with each particular raw data unit identifies the source of the raw data comprised by the particular raw data unit.

8. The apparatus of claim 1, wherein selecting the format conversion function for the particular raw data unit and causing execution of the selected format conversion function with respect to the particular raw data unit is performed only in response to determining that the format conversion routing metadata associated with the particular raw data unit indicates that the raw data of the raw data unit requires conversion to a normalized data format.

9. The apparatus of claim 1, wherein selecting the format conversion function for the particular raw data unit and causing execution of the selected format conversion function with respect to the particular raw data unit is performed only in response to determining, based at least in part on the format conversion routing metadata, that a format conversion function has been defined with respect to the source of the raw data comprised by the particular raw data unit.

10. The apparatus of claim 1, wherein the raw data comprised by the raw data unit and the normalized data comprise telemetry data associated with at least one operational system, and the at least one non-transitory memory and the program code are configured to, with the at least one processor, further cause the apparatus to at least:

cause performance of at least one enterprise management operation with respect to the at least one operational system based at least in part on normalized telemetry data of the normalized data.

11. A computer-implemented method comprising:

receiving raw data units and format conversion routing metadata associated with the raw data units, wherein raw data comprised by each raw data unit is formatted according to a particular original data format corresponding to a source of the raw data;

for each particular raw data unit of the received raw data units, selecting a format conversion function for the particular raw data unit from a plurality of format conversion functions based at least in part on the format conversion routing metadata associated with the particular raw data unit, wherein each format conversion function of the plurality of format conversion functions is configured to convert the raw data comprised by a given raw data unit from the particular original data format associated with the format conversion function into a particular normalized data format associated with the format conversion function; and causing execution of the selected format conversion function with respect to the particular raw data unit, wherein execution of the selected format conversion function with respect to the particular raw data unit outputs normalized data that is a normalized instance of the raw data comprised by the particular raw data unit, which normalized data is formatted according to the normalized data format associated with the selected format conversion function.

12. The method of claim 11, further comprising:

generating the format conversion routing metadata for each raw data unit based at least in part on the source of the raw data comprised by the raw data unit.

13. The method of claim 11, further comprising:

inserting the normalized data output for each corresponding raw data unit into a data stream associated with the raw data unit.

14. The method of claim 11, wherein at least a subset of the plurality of format conversion functions are each associated with a different original data format from a plurality of different original data formats.

15. The method of claim 11, wherein selecting the format conversion function for each particular raw data unit comprises selecting the format conversion function that is associated with the original data format according to which the raw data of the particular raw data unit is formatted.

16. The method of claim 11, wherein selecting the format conversion function for each particular raw data unit is based at least in part on a mapping of sources of the raw data of the raw data units each to an associated format conversion function of the plurality of format conversion functions.

17. The method of claim 16, wherein the format conversion routing metadata associated with each particular raw data unit identifies the source of the raw data comprised by the particular raw data unit.

18. The method of claim 11, wherein selecting the format conversion function for the particular raw data unit and causing execution of the selected format conversion function with respect to the particular raw data unit is performed only in response to determining that the format conversion routing metadata associated with the particular raw data unit indicates that the raw data of the raw data unit requires conversion to a normalized data format.

19. The method of claim 11, wherein selecting the format conversion function for the particular raw data unit and causing execution of the selected format conversion function with respect to the particular raw data unit is performed only in response to determining, based at least in part on the format conversion routing metadata, that a format conversion function has been defined with respect to the source of the raw data comprised by the particular raw data unit.

20. A computer program product comprising at least one non-transitory computer-readable storage medium having computer-readable program code portions stored therein, the computer-readable program code portions comprising an executable portion configured to:

receive raw data units and format conversion routing metadata associated with the raw data units, wherein raw data comprised by each raw data unit is formatted according to a particular original data format corresponding to a source of the raw data;

for each particular raw data unit of the received raw data units, select a format conversion function for the particular raw data unit from a plurality of format conversion functions based at least in part on the format conversion routing metadata associated with the particular raw data unit, wherein each format conversion function of the plurality of format conversion functions is configured to convert the raw data comprised by a given raw data unit from the particular original data format associated with the format conversion function into a particular normalized data format associated with the format conversion function; and cause execution of the selected format conversion function with respect to the particular raw data unit, wherein execution of the selected format conversion function with respect to the particular raw data unit outputs normalized data that is a normalized instance of the raw data comprised by the particular raw data unit, which normalized data is formatted according to the normalized data format associated with the selected format conversion function.

* * * * *